(12) United States Patent
Weichmann et al.

(10) Patent No.: US 8,000,363 B2
(45) Date of Patent: Aug. 16, 2011

(54) SOLID STATE LASER DEVICE WITH REDUCED TEMPERATURE DEPENDENCE

(75) Inventors: Ulrich Weichmann, Aachen (DE); Jaione Bengoechea Apezteguia, Aachen (DE); Patrice Jean-Pierre Camy, Caen (FR); Jean-Louis Doualan, Rots (FR); Richard Moncorge, Breville (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 12/527,920

(22) PCT Filed: Feb. 22, 2008

(86) PCT No.: PCT/IB2008/050647
§ 371 (c)(1),
(2), (4) Date: Aug. 20, 2009

(87) PCT Pub. No.: WO2008/104910
PCT Pub. Date: Sep. 4, 2008

(65) Prior Publication Data
US 2010/0118903 A1 May 13, 2010

(30) Foreign Application Priority Data
Feb. 27, 2007 (EP) .................................. 07300829

(51) Int. Cl.
*H01S 3/16* (2006.01)
*H01S 3/14* (2006.01)
*H01S 3/08* (2006.01)

(52) U.S. Cl. ................. 372/41; 372/39; 372/98

(58) Field of Classification Search ............... 372/41, 372/92
See application file for complete search history.

(56) References Cited

U.S. PATENT DOCUMENTS

| 4,949,348 | A * | 8/1990 | Nguyen et al. ............ 372/41 |
| 6,490,309 | B1 | 12/2002 | Okazaki et al. |
| 2001/0022566 | A1 | 9/2001 | Okazaki |
| 2005/0265411 | A1 | 12/2005 | Takeuchi et al. |
| 2006/0153261 | A1 * | 7/2006 | Krupke .................... 372/39 |
| 2008/0159339 | A1 * | 7/2008 | Weichmann et al. ....... 372/5 |
| 2009/0067453 | A1 | 3/2009 | Mizuuchi et al. |
| 2010/0118903 | A1 * | 5/2010 | Weichmann et al. ...... 372/41 |

FOREIGN PATENT DOCUMENTS

WO 2005117216 A2 12/2005

(Continued)

OTHER PUBLICATIONS

Deren et al: "spectroscopic Characterization of LaAL03 Crystal Doped With Pr3+ Ions"; Journal of Luminescence Vo. 122-123, pp. 40-43, Dec. 6, 2006.

(Continued)

*Primary Examiner* — Minsun Harvey
*Assistant Examiner* — Phillip Nguyen

(57) ABSTRACT

The present invention relates to a solid state laser device with a solid state gain medium between two resonator end mirrors (3, 5) and a GaN-based pump laser (1) arranged to optically pump the solid state gain medium. The solid state gain medium is a $Pr^{3+}$-doped crystalline or polycrystalline host material (4) which has a cubic crystalline structure and highest phonon energies of $\leq 600\ cm^{-1}$ and provides a band gap of $\geq 5.5$ eV. The proposed solid state laser can be designed to emit at several visible wavelengths with the emitted power showing a reduced dependence on the temperature of the GaN-based pump laser (1).

14 Claims, 5 Drawing Sheets

FOREIGN PATENT DOCUMENTS

WO 2006109730 A1 10/2006

OTHER PUBLICATIONS

Laroche et al: Spectroscopic Investigations of the 4f5d Energy Levels of pR3+ in Fluoride Crystals by Excited-State Absorption and Two-Step Excitation Measurements; Journal of The Optical Society of America B, vol. 16, No. 12, Dec. 1999, pp. 2269-2277.

Loong et al: "Fluorescence Lifetimes of Pr3+ Centers in Mixed CaF2 SrF2 Crystals"; Journal of Luminescence, vol. 53 (1992), pp. 503-506.

Richter et al: "Diode Pumping of a Continuous-Wave Pr3+-Doped LiYF4 Laser"; Optics Letters, vol. 29, No. 22, Nov. 15, 2004, pp. 2638-2640.

Sandrock et al: "Efficient Continuous Wave-Laser Emission of Pr3+D-Doped Fluorides at Room Temperature"; Applied Physics B, vol. 58, No. 2, pp. 149-151 (1994).

Smart et al: "CW Room Temperature Upconversion Lasing at Blue, Green and Red Wavelengths in Infrared-Pumped Pr3+-Doped Fluoride Fibre"; Electronics Letters Jul. 4, 1991, vol. 27, Vo. 14, pp. 1307-1309.

Richter et al: "Continuous-Wave Ultraviolet Generation at 320 NM by Intracavity Frequency Doubling of Red-Emitting Praseodymium Lasers"; Optics Express, Apr. 17, 2006, vol. 14, No. 8, pp. 3282-3287.

Cheung et al: "Excited-State Absorption in Pr3+:Y3A15O12": Physical Review B, vol. 49, No. 21, pp. 14827-14835.

* cited by examiner

SOLID STATE LASER DEVICE WITH REDUCED TEMPERATURE DEPENDENCE

FIELD OF THE INVENTION

The present invention relates to a solid state laser device comprising a solid state gain medium arranged between two resonator end mirrors of a laser cavity, said solid state gain medium being composed of a $Pr^{3+}$-doped host material, and a GaN-based solid state pump laser arranged to optically pump said solid state gain medium.

The inherent high radiance of lasers makes them an ideal candidate as the light source for all applications with high optical demands. Once lasers emitting in blue, green and red are available, they can e.g. replace UHP lamps as the light source in projection systems. The lack of integrated laser sources in the green wavelength region has until now hindered the widespread use of lasers for display or illumination applications. Nowadays used laser sources for the green wavelength region rely on frequency conversion either by upconversion or by second harmonic generation of an infrared laser source. An alternative to upconversion or second harmonic generation from the infrared wavelength region is the frequency conversion of blue laser sources just like in the case of the well-known dye lasers or the Nd:YAG laser for the infrared. With the recent development of GaN-based laser diodes for the blue-violet region this scheme becomes attractive for all-solid-state devices at visible wavelengths. In such a solid state laser device an appropriate solid state gain medium is optically pumped by an GaN-based laser diode in order to emit laser radiation in the blue, green or red wavelength region.

BACKGROUND OF THE INVENTION

Appropriate solid state gain media for such a device must have absorption lines in the blue-violet wavelength region. Different crystalline host materials doped with rare earth ions have been already proposed as gain media for such solid state laser devices. The $Pr^{3+}$-ion is of great interest in this context since it shows absorption at the typical emission wavelength of GaN-laser diodes and can convert this radiation into laser emission at blue, green, red and orange wavelengths.

U.S. Pat. No. 6,490,309 B1 discloses a solid state laser device in which a $Pr^{3+}$-doped crystal is optically pumped by a GaN-based laser diode. The document proposes different $Pr^{3+}$-doped crystals to obtain laser emission from $Pr^{3+}$ at several visible wavelengths. The exemplary embodiments are based on $Pr^{3+}$-doped $LiYF_4$ (YLF) crystals. Only one of the host materials listed in this document, the $Y_3Al_5O_{12}$ crystal (YAG), is a cubic crystal.

However, Cheung et al. in "Excited-state absorption in $Pr^{3+}:Y_3Al_5O_{12}$", Physical Review B, Vol. 49, No. 21, pages 14827-14835 demonstrated that exited state absorption from the $^3P_0$ energy level rules out the possibility of using $Pr^{3+}$:YAG as a solid state laser crystal in the visible and near ultraviolet spectral region.

It is well known that rare earth ions placed in crystalline host materials show narrow spectral absorption lines. FIG. 1 shows an example of the absorption line of $Pr^{3+}:LiYF_4$ at room temperature and for two different polarizations with respect to the crystal axis. On the other hand, the emission of GaN-based laser diodes exhibits a wavelength shift related to the temperature of the laser diode and to the diode current. Moreover, the fabrication process leads to different emission wavelengths with a peak centered between 440 and 450 nm. Measurements of the spectral shift of the laser emission of a commercially available GaN-based laser diode for different diode currents and a fixed laser diode base plate temperature of 25° C. show that the wavelength for the maximum emission varies by about 2 nm for the diode current varying from 200 mA to 500 mA. This corresponds to an output power variation from 110 mW to 480 mW. The spectral shift for a fixed diode current and a laser diode base plate temperature variation between 20 and 30° C. is about 0.5 nm for 10° C. The emission wavelength of this GaN-based laser diode varies between 443.7 nm at 20° C. and for a diode current of 110 mA (just above the threshold of the laser diode) and 446.5 nm at 30° C. and for a diode current of 500 mA (maximum specified current for this laser diode). Due to the narrow spectral absorption lines of the gain media and the temperature and current dependence of the maximum emission of GaN-based laser diodes the corresponding solid state laser devices show a strong temperature sensitivity. This makes an efficient and stable optical excitation of $Pr^{3+}$-doped host materials by means of GaN-based laser diodes difficult.

SUMMARY OF THE INVENTION

It is an object of the present invention to provide a solid state laser device with reduced temperature sensitivity, said solid state laser comprising a solid state gain medium being optically pumped by a GaN-based pump laser.

The object is achieved with the solid state laser device according to claim 1. Advantageous embodiments of this solid state laser device are subject matter of the dependent claims or are described in the subsequent portion of the description.

The proposed solid state laser device comprises at least a solid state gain medium arranged between two resonator end mirrors of a laser cavity and a GaN-based pump laser arranged to optically pump the solid state gain medium. The solid state gain medium is a $Pr^{3+}$-doped polycrystalline or crystalline material, which has a cubic crystalline structure and which is selected to have maximum phonon energies of $\leq 600$ cm$^{-1}$ and a band gap of $\geq 5.5$ eV.

When using this crystalline or polycrystalline host material doped with $Pr^{3+}$-ions, which is characterized by a cubic crystal structure, low phonon energies and a high band gap, astonishingly a significant reduction in temperature sensitivity of the laser device is achieved. Therefore, the present invention provides a temperature insensitive solid state laser device for the visible wavelength region, which is able to emit laser radiation in the blue, green, red and orange wavelength region, dependent on the design of the resonator end mirrors. Due to the reduced temperature sensitivity such a solid state laser light source can easily be used in consumer applications like in illumination or projection devices. Therefore the proposed solid state laser device provides the potential to replace nowadays used UHP lamps as the light source for projection. Although the only cubic host materials doped with $Pr^{3+}$-ions reported up to now are YAG crystals, which have been shown to be not suitable for use as a gain medium of a laser at room temperature, the inventors have found that cubic host materials fulfilling the above requirements of the large band gap and low phonon energies are nevertheless suitable as gain materials and moreover provide the astonishing low temperature dependence as described above. Preferred host materials are $KY_3F_{10}$, $SrF_2$, $CaF_2$ or the cubic modification of $LaAlO_3$. Typical doping concentrations are within the range of 0.05 at % to 10 at %.

The use of cubic host materials provides the additional advantage that these materials can be prepared as transparent ceramics. Drawing a crystal is a slow and tedious procedure, which in general needs to be done with great care. A host material that has a cubic structure can be produced as a transparent ceramic by means of sintering, which facilitates the production in high quantities dramatically. Furthermore, the possibility of preparing the laser material by sintering techniques opens the door to easier ways of structuring it, for example in the form of waveguides that can efficiently match the elliptical beam shape of GaN-based laser diodes. Since cubic crystals are isotropic materials it is also easily possible to directly grow crystallized films without orientation process issues on a substrate, in order to obtain waveguides.

In a preferred embodiment the solid state gain medium is arranged on a common substrate together with the GaN-based pump laser. It is also possible to arrange several of such solid state laser devices on the same substrate, for example in order to provide an array of laser light sources. In another embodiment, a RGB (R: red, G: green, B: blue) laser light source is realized in which a GaN-based laser diode emitting in the blue wavelength region is arranged side by side on a common substrate with two of the proposed solid state laser devices, one of which emitting in the red wavelength region and the other emitting in the green wavelength region.

These and other aspects of the invention will be apparent from and illustrated with reference to the embodiments described herein after.

BRIEF DESCRIPTION OF THE DRAWINGS

The proposed solid state laser device is described in the following by way of examples in connection with the accompanying figures without limiting the scope of protection as defined by the claims. The figures show:

DETAILED DESCRIPTION OF EMBODIMENTS

Figure 1:
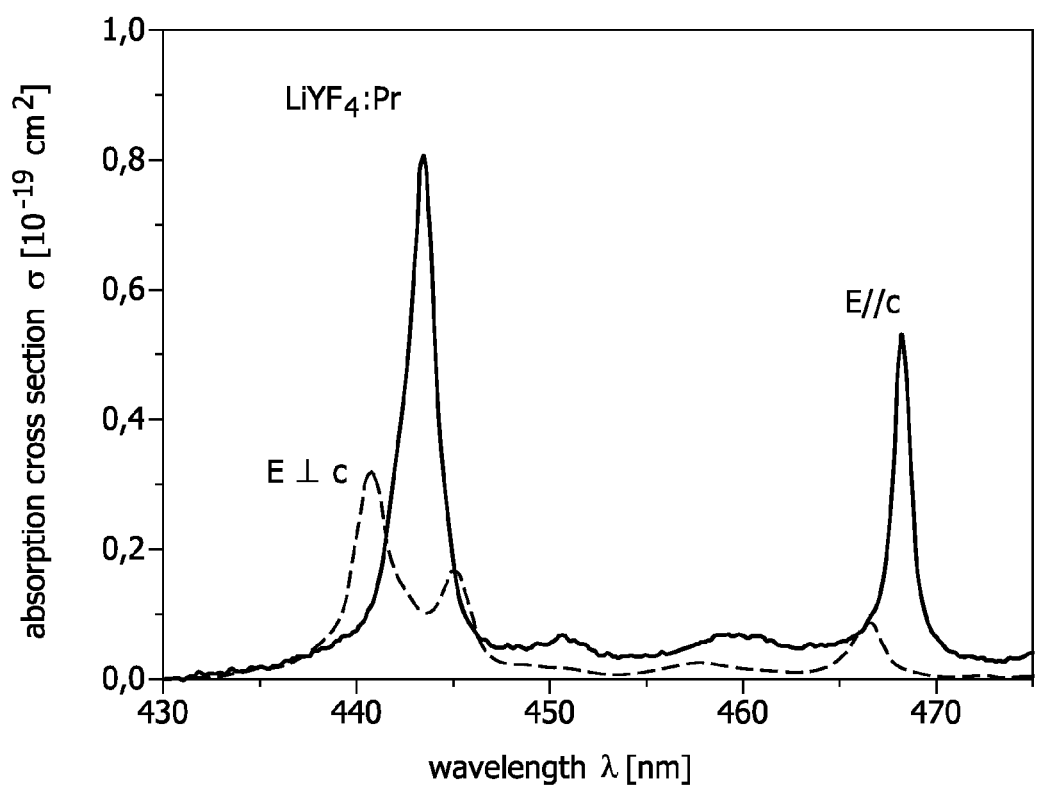
FIG. 1 ground state absorption lines of $Pr^{3+}$:$LiYF_4$ at room temperature for two different polarizations.

The absorption spectrum of $Pr^{3+}$:$LiYF_4$ shown in FIG. 1 has already been explained in the introductory portion of this description. Due to the small half widths of the absorption lines and the temperature shift of GaN-based laser diodes a stable operation of a solid state laser device based on a combination of such a gain medium with a GaN-based pump laser is difficult to achieve.

Figure 2:
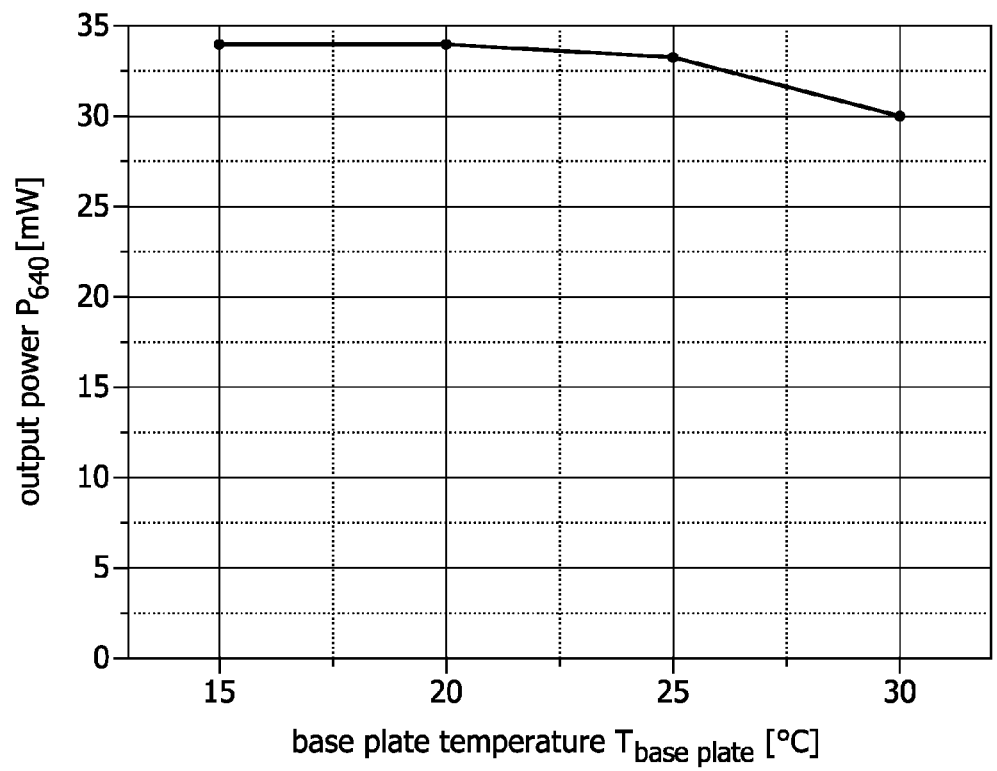
FIG. 2 measured output power of a $Pr^{3+}$:$KY_3F_{10}$ laser according to the present invention emitting at 640 nm for different base plate temperatures.

FIG. 2 shows a measurement of the output power of a solid state laser device according to the present invention. This measurement is based on a solid state laser device emitting at 640 nm with a $Pr^{3+}$:$KY_3F_{10}$ gain medium. The diagram shows the measured output power for different base plate temperatures of the GaN-based pump laser diode between 15° C. and 30° C. The very low temperature sensitivity is evident from this diagram. Only a minor change in output power is observed for the temperature range of 15° C.

Figure 3:
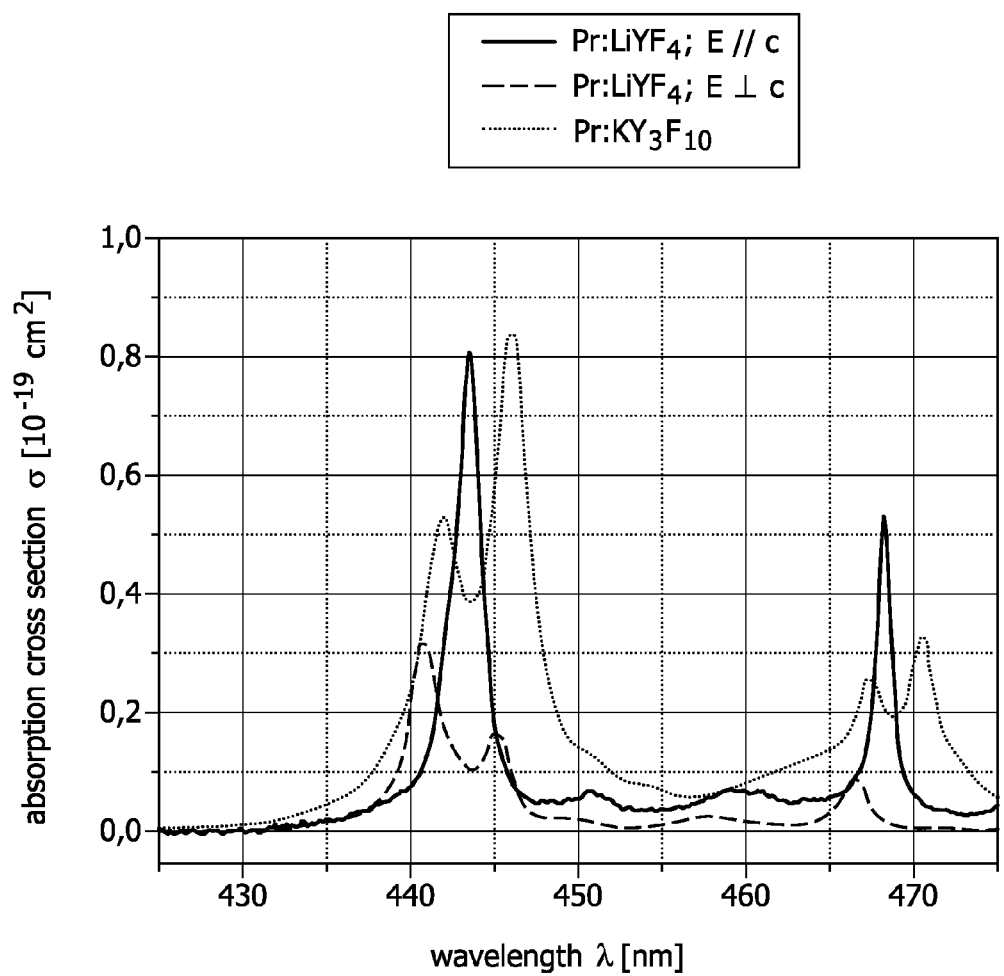
FIG. 3 a comparison of absorption spectra of $Pr^{3+}$:$KY_3F_{10}$ and $Pr^{3+}$:$LiYF_4$.

This significantly reduced temperature-sensitivity compared with other host materials is based on the astonishingly broad absorption lines of $Pr^{3+}$-ions when placed in crystals of cubic structure like $KY_3F_{10}$, $SrF_2$, $CaF_2$ or the cubic modification of $LaAlO_3$. As an example, FIG. 3 shows the absorption profile of $Pr^{3+}$:$KY_3F_{10}$, independent of the polarization, in comparison with the two absorption spectra of $Pr^{3+}$:$LiYF_4$ (YLF) according to the different crystal orientations. The significantly broader absorption lines of $Pr^{3+}$:$KY_3F_{10}$ are evident from this figure.

Figure 4:
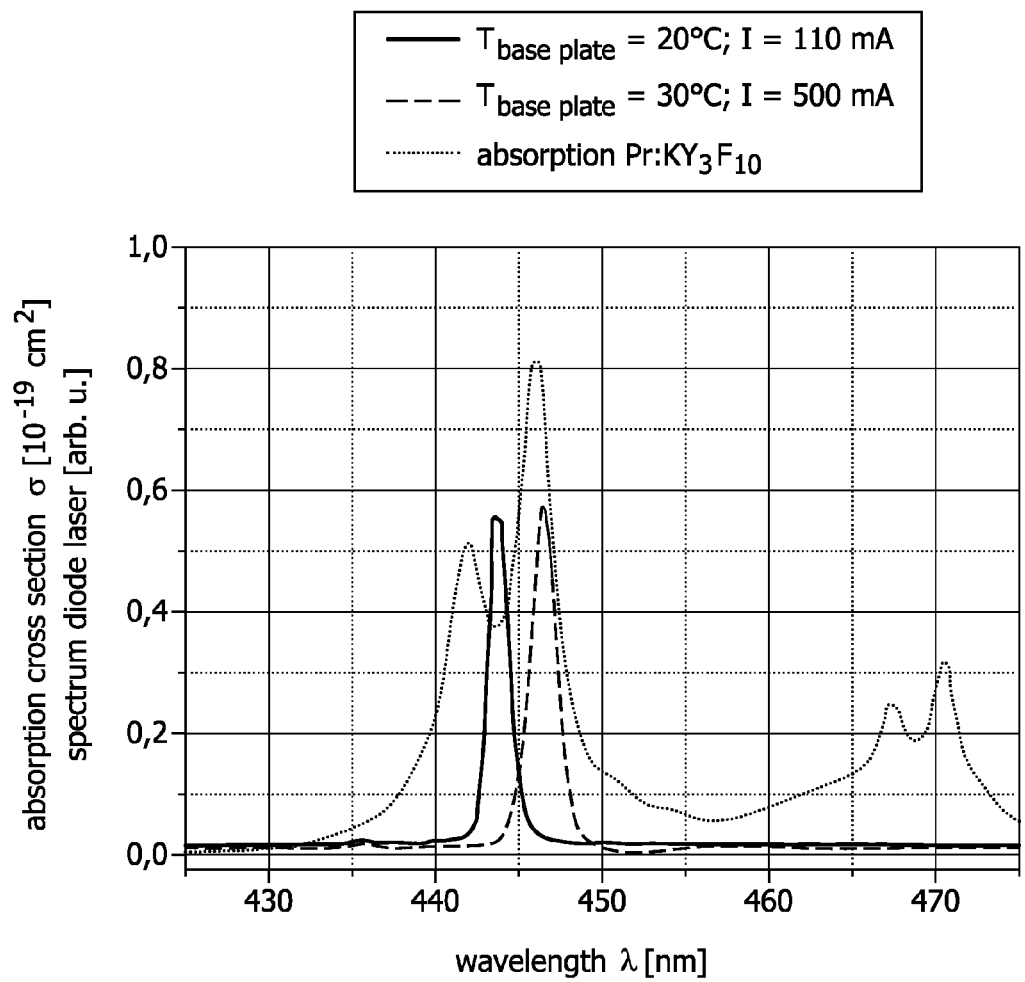
FIG. 4 the absorption cross section of $Pr^{3+}$:$KY_3F_{10}$ and the GaN-based laser diode emission for different values of temperature and diode current.

As already outlined in the introductory portion of this description, GaN-based laser diodes exhibit a shift of their emission wavelength that depends both on the diode temperature as well as on the applied diode current. When the laser emission from a GaN-based laser diode is used to stimulate the laser emission of a rare earth ion in a crystal, the wavelength shift of the pump laser can strongly affect the power absorbed by the rare earth ion and therefore influence the output of the solid state laser. Different from the already described situation of $Pr^{3+}$:$LiYF_4$, $Pr^{3+}$-ions placed in cubic crystals like $KY_3F_{10}$, $LaAlO_3$, $SrF_2$ or $CaF_2$ show broad and intense absorption lines that overlap spectrally very well with the GaN-based laser diode emission. In these hosts the overlap between the emission of the GaN-based laser diode and the absorption of $Pr^{3+}$ is optimized and moreover, the absorption exhibits only a minor change with the laser diode temperature. In the case of $Pr^{3+}$:$KY_3F_{10}$ these absorption lines form a broad band, independent of the crystal orientation, that spreads from 435 nm to 450 nm with its maximum placed at around 446 nm. This is illustrated in FIG. 4 showing the absorption cross section of $Pr^{3+}$:$KY_3F_{10}$ and the GaN-based laser diode emission for different values of temperature and diode current.

Another requirement for the host material when dealing with visible laser action from Praseodymium (Pr) is the low phonon energy required in order to avoid the depopulation of the $^3P_0$ upper laser level. The maximum phonon energy of the $KY_3F_{10}$ crystal is 495 $cm^{-1}$. Generally it has been found that the energies of the highest phonons in the cubic crystals used in the solid state laser device according to the present invention have to be lower or equal to 600 $cm^{-1}$. The already known YAG crystal has a highest phonon energy of 700 $cm^{-1}$ and is therefore not suitable for the proposed solid state laser device.

Figure 5:
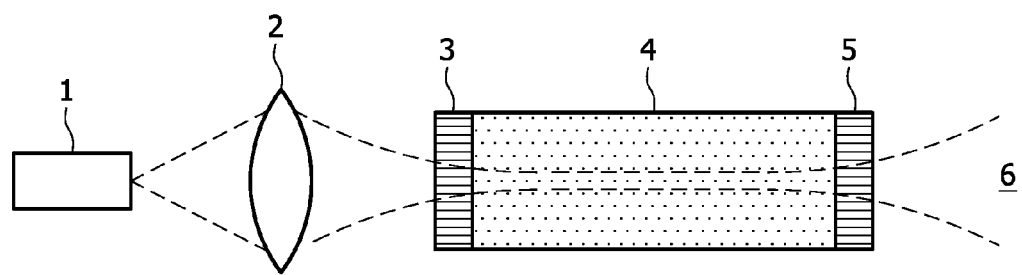
FIG. 5 a schematic view of an exemplary construction of the proposed solid state laser device.

FIG. 5 shows a schematic setup of a solid state laser device according to one exemplary embodiment of the present invention. The laser emission of a GaN-based compound laser diode 1 is focused in the $Pr^{3+}$-doped crystal 4 by means of an optical set up 2, for example a lens. Two mirrors 3, 5 are required to build the laser resonator. These two mirrors are formed of appropriate coatings on the end faces of the $Pr^{3+}$-doped crystal 4. The incoupling mirror 3 for coupling in the pump radiation is coated to have a high transmittance (80% or higher) at the pump wavelength of 446 nm and to be highly reflective for the laser wavelength of the $Pr^{3+}$-doped crystal 4, for example at the red wavelength of 645 nm. The second mirror 5, placed at the outcoupling side, is coated to be highly reflective at the pump wavelength of 446 nm and to have a partial transmittance at the lasing wavelength, for example a transmission of 10% for the red wavelength of 645 nm. The $Pr^{3+}$-doped $KY_3F_{10}$ crystal 4 has for example a length of 2 mm and absorbs 60-90% of the pump power. The visible laser emission, with a central wavelength of 645 nm in this example, is indicated by reference number 6 in FIG. 5.

Figure 6:
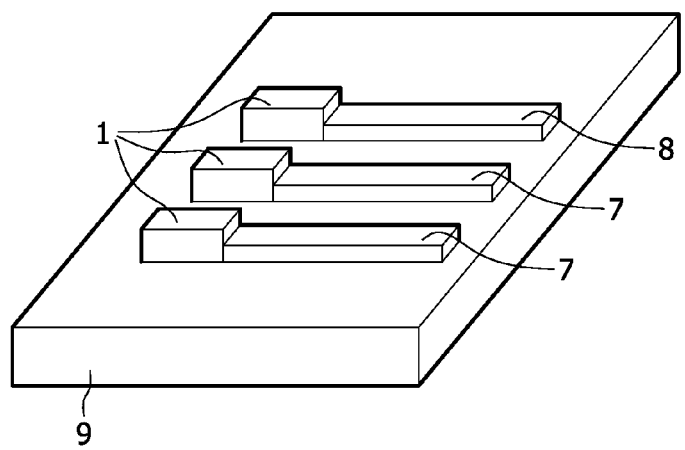
FIG. 6 a schematic view of a further exemplary construction of the solid state laser device of the present invention as part of an integrated RGB laser source

FIG. 6 shows another exemplary embodiment in which the proposed solid state laser device is part of an integrated RGB laser. The $Pr^{3+}$-doped crystalline material in this example is brought to the form of a waveguide to form a waveguide laser 7. In such a set up the geometry of this active medium, i.e. the waveguide, fits the elliptical beam shape of the GaN-based laser diode 1, which simplifies the optical set up. The waveguide laser 7 can be directly connected to the GaN-based laser diode in such a case.

In FIG. 6 two of the proposed solid state laser devices are formed side by side. One of these laser devices is designed to emit in the red wavelength region and the other is designed to emit in the green wavelength region. To this end, the coatings of the outcoupling mirrors 5 are designed to be highly transparent in the green wavelength region and highly reflective in the red wavelength region in one laser device and to be highly transparent in the red wavelength region and highly reflective in the green wavelength region in the other laser device. A further GaN-based laser diode 1 is arranged adjacent to these two solid state laser devices. This further GaN-based laser diode emits blue laser radiation at 446 nm which is coupled in an undoped waveguide 8 having the same dimensions of the waveguides of waveguide lasers 7. With this arrangement on a common substrate 9, providing the cooling structure for the lasers, a RGB laser source is provided.

Two things should be highlighted here. On the one hand, the maximum of the absorption of $Pr^{3+}$:$KY_3F_{10}$ in the blue spectral region matches the maximum of the emission of the GaN-based compound laser diodes working at high currents. On the other hand, the broad absorption of $Pr^{3+}$ placed in these hosts allows to take advantage of the broad spectral emission, a characteristic of such GaN-based laser diodes, leading to an efficient absorption of the laser radiation by the $Pr^{3+}$-ions. This combination makes the proposed solid state laser device ideal to obtain efficient laser emission from the $Pr^{3+}$-ion at 490, 522, 545, 607 and 645 nm with dramatically reduced temperature sensitivity. Laser emission from the $Pr^{3+}$:$KY_3F_{10}$ crystal at all these wavelengths is possible by designing the resonator with proper laser mirrors. For example, if laser emission at a green wavelength is required, mirror 3 should be highly reflective at a wavelength in the range of 520 to 550 nm and should have a high transmittance for the pump wavelength of 446 nm and preferably also for the other wavelengths emitted by the $Pr^{3+}$-ions, in order to suppress their laser action. Optical mirror 5 should have a partial transmittance for the lasing wavelength, for example at 522 nm, and a high transmittance for the rest of the wavelengths emitted by the $Pr^{3+}$-ions. Typically these requirements are obtained with dichroic mirrors or dichroic coatings.

While the invention has been illustrated and described in detail in the drawings and forgoing description, such illustration and description are to be considered illustrative or exemplary and not restrictive, the invention is not limited to the disclosed embodiments. The different embodiments described above and in the claims can also be combined. Other variations to the disclosed embodiments can be understood and effected by those skilled in the art in practicing the claimed invention, from a study of the drawings, the disclosure and the appended claims. For example, the proposed solid state laser device is not limited to laser set ups according to FIGS. 5 and 6. Several modifications of such a set up are possible as known in the art. The use of the proposed host material does not limit the invention to any special laser arrangement. Any laser arrangement known in the art for such a solid state laser device can be used.

In the claims, the word "comprising" does not exclude other elements or steps, and the indefinite article "a" or "an" does not exclude a plurality. The mere fact that measures are recited in mutually different dependent claims does not indicate that a combination of these measures cannot be used to advantage. Any reference signs in the claims should not be construed as limiting the scope of these claims.

LIST OF REFERENCE SIGNS

1 GaN-based laser diode
2 optical setup
3 incoupling mirror
4 $Pr^{3+}$-doped crystal
5 outcoupling mirror
6 laser emission
7 waveguide laser
8 undoped waveguide layer
9 substrate

The invention claimed is:

1. Solid state laser device comprising a solid state gain medium arranged between two resonator end mirrors (3, 5) of a laser cavity, said solid state gain medium being formed of a $Pr^{3+}$-doped host material (4), and a GaN-based solid state pump laser (1) arranged to optically pump said solid state gain medium,
wherein the host material of the solid state gain medium is a crystalline or polycrystalline material having a cubic crystal structure and is selected to have highest phonon energies of $\leqq 600$ cm$^{-1}$ and a band gap of $\geqq 5.5$ eV.

2. Solid state laser device according to claim 1,
wherein the crystalline or polycrystalline material with a cubic crystal structure is one of $KY_3F_{10}$, $SrF_2$, $CaF_2$ and the cubic modification of $LaAlO_3$.

3. Solid state laser device according to claim 1,
wherein the host material of the solid state gain medium is a single crystal.

4. Solid state laser device according to claim 1,
wherein the host material of the solid state gain medium is a transparent ceramic.

5. Solid state laser device according to claim 1,
wherein the solid state gain medium is designed as a waveguide.

6. Solid state laser device according to claim 1,
wherein the GaN-based solid state pump laser (1) is arranged on a common substrate (9) with the solid state gain medium.

7. Solid state laser device according to claim 6,
wherein the solid state gain medium is designed as a waveguide adapted to match an elliptical beam shape of pump radiation emitted by the GaN-based solid state pump laser (1).

8. Solid state laser device according to claim 1,
wherein the two resonator end mirrors (3, 5) are formed of reflecting layer structures on end faces of the solid state gain medium.

9. RGB laser source with at least two solid state laser devices according to claim 1 together with at least one additional GaN-based solid state pump laser (1) side by side on a common substrate (9), said additional GaN based solid state pump laser (1) emitting in the blue wavelength region, wherein one of the at least two laser devices is designed to emit laser radiation in the red wavelength region and another of the at least two laser devices is designed to emit laser radiation in the green wavelength region.

10. RGB laser source with at least two solid state laser devices according to claim 1 together with at least one additional GaN-based solid state pump laser (1) side by side on a common substrate (9), said additional GaN-based solid state pump laser (1) emitting in the blue wavelength region, wherein the solid state gain media of the at least two solid state laser devices are designed as waveguides and arranged side by side with a further undoped waveguide (8) guiding laser radiation emitted by the additional GaN-based solid state pump laser (1), and wherein one of the at least two laser devices is designed to emit laser radiation in the red wavelength region and another of the at least two laser devices is designed to emit laser radiation in the green wavelength region.

11. Solid state laser device comprising a solid state gain medium arranged between two resonator end mirrors (3, 5) of a laser cavity, said solid state gain medium being formed of a $Pr^{3+}$-doped host material (4), and a GaN-based solid state pump laser (1) arranged to optically pump said solid state gain medium,
wherein the host material of the solid state gain medium is a polycrystalline material having a cubic crystal structure and is selected to have highest phonon energies of $\leq 600$ cm$^{-1}$ and a band gap of $\geq 5.5$ eV and wherein the crystalline or polycrystalline material with a cubic crystal structure is one of $SrF_2$, $CaF_2$ and the cubic modification of $LaAlO_3$.

12. Solid state laser device comprising a solid state gain medium arranged between two resonator end mirrors (3, 5) of a laser cavity, said solid state gain medium being formed of a $Pr^{3+}$-doped host material (4), and a GaN-based solid state pump laser (1) arranged to optically pump said solid state gain medium,
wherein the host material of the solid state gain medium is a crystalline material having a cubic crystal structure and is selected to have highest phonon energies of $\leq 600$ cm$^{-1}$ and a band gap of $\geq 5.5$ eV and wherein the crystalline or polycrystalline material with a cubic crystal structure is one of $SrF_2$, $CaF_2$ and the cubic modification of $LaAlO_3$.

13. Solid state laser device according to claim 11, wherein the polycrystalline material with a cubic crystal structure is further selected from $KY_3F_{10}$.

14. Solid state laser device according to claim 12, wherein the crystalline material with a cubic crystal structure is further selected from $KY_3F_{10}$.

* * * * *